Figure 1:
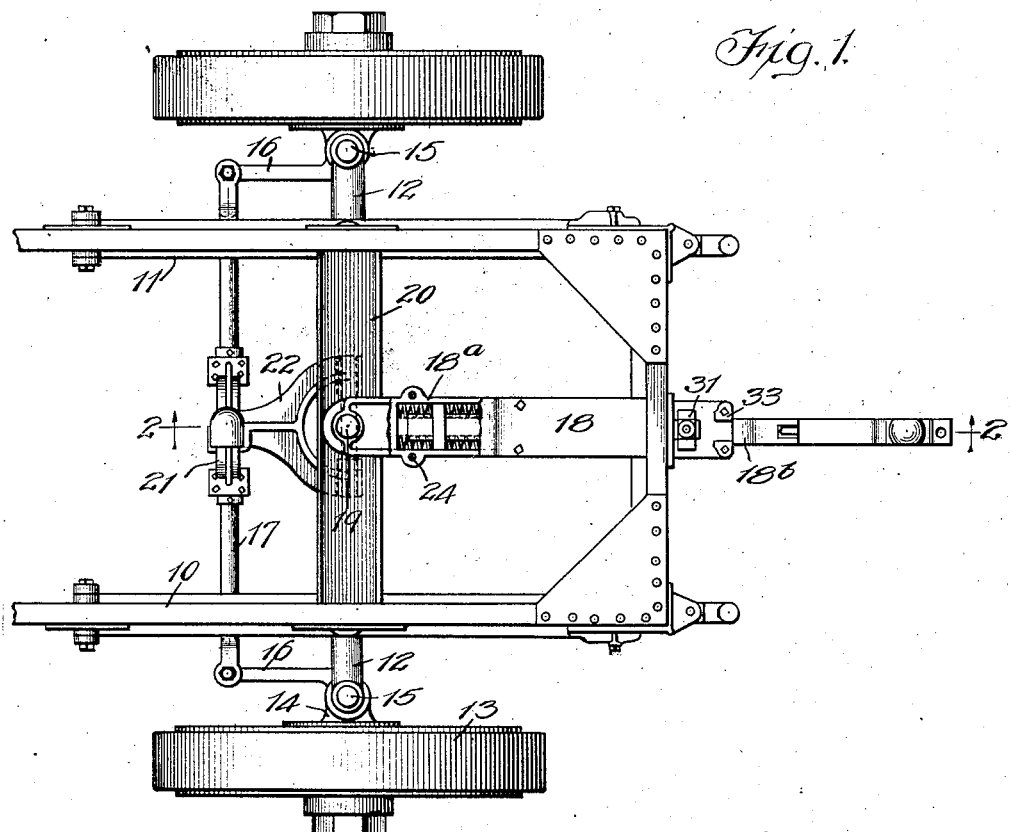

A. B. CADMAN.
TRAILER TRUCK.
APPLICATION FILED NOV. 2, 1917.

1,304,261. Patented May 20, 1919.

Witnesses
W. F. Kilroy
Harry R. L. White

Inventor:
Addi Benjamin Cadman
By Miller Chindahl & Parker
Attys.

UNITED STATES PATENT OFFICE.

ADDI BENJAMIN CADMAN, OF BELOIT, WISCONSIN, ASSIGNOR, BY MESNE ASSIGNMENTS, TO WARNER MANUFACTURING COMPANY, OF SOUTH BELOIT, ILLINOIS, A CORPORATION OF WISCONSIN.

TRAILER-TRUCK.

1,304,261.   Specification of Letters Patent.   Patented May 20, 1919.

Original application filed December 6, 1916, Serial No. 135,419. Divided and this application filed November 2, 1917. Serial No. 199,818.

*To all whom it may concern:*

Be it known that I, ADDI BENJAMIN CADMAN, a citizen of the United States, residing at Beloit, in the county of Rock and State of Wisconsin, have invented certain new and useful Improvements in Trailer-Trucks, of which the following is a specification.

The invention relates to a trailer truck of the type adapted to be hitched onto a motor vehicle or other drawing unit and coupled together with any desired number of trucks to form a train, and which is preferably reversible by reason of its being of duplicate construction at opposite ends, so that the truck may be drawn or steered from either end; and the invention relates more particularly to the draw-bars forming the coupling members between the drawing unit and the trucks or between the several trucks of a train.

In the use of trailer trucks of the type set forth, and more especially in the use of a plurality of trucks connected together in a train, it is very desirable that the connection between the trucks be capable of yielding to a limited extent in order that the shock incident to the sudden starting or stopping of the truck unit, or to other causes, will be cushioned; and it is one of the objects of my invention to provide a trailer truck having a draw-bar of improved construction which will effectively accomplish the cushioning effect desired.

A further object of the invention is to provide a trailer truck having a draw-bar which may be locked in a central position with reference to the truck frame, when said draw-bar is at the end of the truck forming the rear end, without interfering with the cushioning operation of the draw-bar.

Figure 2:
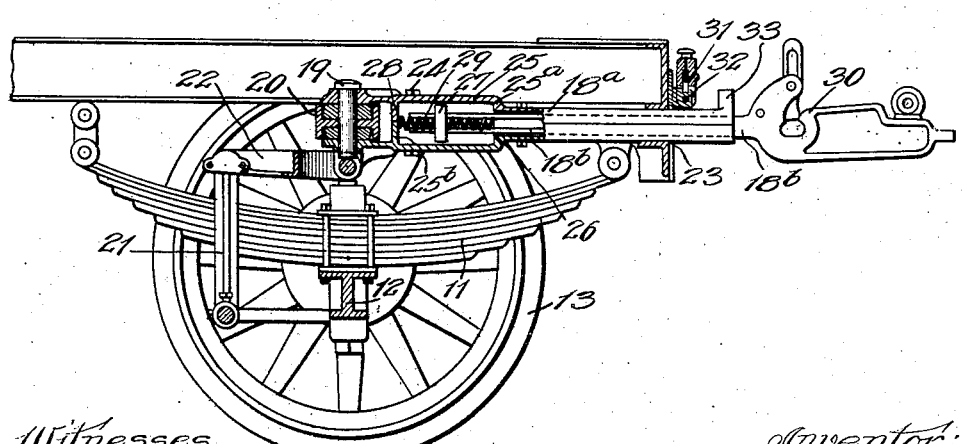

The objects of the invention thus generally stated, together with other and ancillary advantages, are attained by the construction and arrangement illustrated in the accompanying drawings forming part hereof, in which Figure 1 is a fragmental top plan view of one end of a trailer truck having a draw-bar thereon embodying my invention, a portion of the draw-bar being shown in section. Fig. 2 is a sectional view on line 2—2 Fig. 1, a portion of the draw-bar being shown in elevation.

In the drawings, I have illustrated a preferred form of truck embodying my invention. Such truck, which is described and claimed in my copending application Serial No. 135,419, filed December 6, 1916, and of which this application is a division, comprises a rectangular body frame 10 of any common or preferred construction, which is supported at its sides through the medium of two springs 11 from an axle 12. Wheels 13 are mounted on journals carried by steering knuckles 14 which are pivoted to opposite ends of the axle to swing on vertical axes 15. Each steering knuckle has an arm 16 which extends longitudinally toward the middle of the frame, and the two arms are directly connected by a rigid transverse tie member or rod 17, the ends of which are pivoted to the ends of the arms.

The draw-bar 18 is pivoted by means of a vertical king pin 19 to a cross-piece 20 forming a rigid part of the frame 10. The end of said bar which is nearest the center of the truck, which for convenience may be termed the rear end, is suitably connected to the tie rod 17 as by means of vertically and horizontally disposed yoke members 21 and 22 pivotally connected together and to the tie rod and draw-bar respectively. The forward end of said draw-bar extends through a horizontal elongated guideway 23 provided between two bars forming the end of the body frame 10, whereby the draw-bar is snugly held to prevent vertical movement with respect to the body frame but to allow horizontal swinging movement of the bar for steering purposes.

The draw-bar is of spring cushioned construction and comprises an outer tubular member 18$^a$ which is pivoted at its rear end to the body frame and an inner member 18$^b$ which is slidably mounted in the outer member. Said outer member 18$^a$ is formed from two similar upper and lower sections secured together by means of bolts 24 and near the rear end of the draw-bar said sections are shaped to form a casing 25 having end walls 25$^a$ and 25$^b$. The forward wall 25$^a$ of said casing is provided with an opening 26 through which the rear end of the slidable member 18$^b$ passes, and near its rear end said member 18$^b$ is provided with an enlargement or bearing head 27 between the opposite sides of which and the forward and rear ends of the casing one or more pairs of opposed compression springs 28 bear so that relative movement of the two members of the bar in either direction is cushioned. Said springs 28 are snugly confined and held in position between the side walls of casing 25 and the inner member 18ᵇ of the draw-bar. For this purpose, the inner member is provided with a groove 29 for each spring in which groove one side of the spring is adapted to lie and is thus supported against movement either upwardly or downwardly.

On the forward end of the inner member of the draw-bar, a coupling head 30 of any preferred construction is provided by means of which the draw-bar is coupled to the draft device attached to the drawing vehicle or to the vehicle to be drawn; and at the end of the truck frame a suitable locking device is provided by means of which the draw-bar may be locked in its intermediate or central position when the end of the truck becomes the rear end in hauling. Said lock preferably comprises a latch or retaining member 31 pivoted at 32 to the end of the body frame 10, and a pair of upstanding lugs forming a keeper 33 on the pivoted or tubular member 18ᵃ of the draw-bar adapted to receive the retaining member. The draw-bar may thus be locked in position without interfering with the spring-cushioned movements of the member 18ᵇ of the draw-bar.

I claim as my invention:

1. A trailer truck having, in combination with a body frame, a draw-bar comprising two members, one slidable longitudinally within the other, the outer member being shaped near one end to form a housing, and a pair of springs entered in said housing and arranged to engage with the inner member to cushion its movements in opposite directions, one of said members being provided with grooves for retaining said springs in position between the inner member and a side wall of the housing.

2. A trailer truck having, in combination with a body frame, a draw-bar comprising two members, one slidable within the other, the outer member being shaped to form near one end a housing and the inner member having a transverse enlargement spaced forwardly from its rear end and fitting neatly between the side walls of said housing, and a pair of coiled springs on each side of the inner member bearing between said transverse enlargement and the opposite end walls of the housing whereby to cushion the movements of the inner member in opposite directions, said inner member being provided with spring-retaining grooves on its opposite sides to partially receive the springs disposed between it and the inner side walls of the housing.

3. A trailer truck having, in combination, a body frame having a cross-piece, a draw-bar comprising two members relatively slidable longitudinally one within the other, the outer one of said members being formed in two substantially similar sections secured together and constructed so as to straddle the cross-piece of the frame to which they are pivoted, and springs mounted within said sectional draw-bar and acting upon the inner member to cushion the movements of the latter in opposite directions.

4. A trailer truck having, in combination, a body frame, a draw-bar including two members relatively slidable longitudinally of each other, one of said members being operatively associated with the body frame and the other one of said members being arranged to be coupled to a unit to be drawn, means acting to cushion the movements of one member relative to the other, and means engaging with the member associated with the frame for locking said draw-bar in central position with reference to the body frame, whereby the coupled member of the draw-bar may be slid longitudinally with reference to the other member while locked against swinging movement.

5. A trailer truck having, in combination, a body frame comprising a crosspiece, and further comprising end bars providing a horizontal elongated guideway; a draw-bar comprising an outer tubular member pivoted to the middle of said crosspiece and passing through said guideway to be guided therein, an inner member mounted to slide longitudinally within said outer member, said inner member having a coupling head on its free end, and springs within the outer member and acting on the inner member to cushion the movements of the latter; and means for locking the outer member of the draw-bar in central position with reference to the body frame whereby the inner member of the draw-bar may be slid longitudinally with reference to the outer member.

In testimony whereof, I have hereunto set my hand.

ADDI BENJAMIN CADMAN.